US012782329B2

(12) United States Patent
Jeon et al.

(10) Patent No.: US 12,782,329 B2
(45) Date of Patent: Nov. 3, 2026

(54) VIRTUAL SENSOR SYSTEM FOR MEASURING VOC INFLOW AMOUNT OF RTO AND METHOD FOR VERIFYING VOC MEASUREMENT SENSOR BY USING SAME

(71) Applicant: LG CHEM, LTD., Seoul (KR)

(72) Inventors: Ye Rin Jeon, Daejeon (KR); Jae Hoon Choi, Daejeon (KR); Chang Song Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 667 days.

(21) Appl. No.: 18/279,383

(22) PCT Filed: Aug. 26, 2022

(86) PCT No.: PCT/KR2022/012790
§ 371 (c)(1),
(2) Date: May 3, 2024

(87) PCT Pub. No.: WO2023/153571
PCT Pub. Date: Aug. 17, 2023

(65) Prior Publication Data
US 2024/0272129 A1 Aug. 15, 2024

(30) Foreign Application Priority Data
Feb. 11, 2022 (KR) ........................ 10-2022-0018487

(51) Int. Cl.
*G01N 30/86* (2006.01)
*G01N 30/68* (2006.01)
*G01N 30/88* (2006.01)

(52) U.S. Cl.
CPC ......... *G01N 30/8675* (2013.01); *G01N 30/68* (2013.01); *G01N 30/8693* (2013.01); *G01N 30/88* (2013.01); *G01N 2030/884* (2013.01)

(58) Field of Classification Search
CPC ...... G01N 3/09; G01N 30/8675; G01N 30/68; G01N 30/8693; G01N 30/88;
(Continued)

(56) References Cited

U.S. PATENT DOCUMENTS 5,466,418 A 11/1995 Swanson et al.
6,165,251 A 12/2000 Lemieux et al.
(Continued)

FOREIGN PATENT DOCUMENTS

CA 2235176 A 10/1999
CN 1790199 A 6/2006
(Continued)

OTHER PUBLICATIONS

Yi Ye-qing et al: "False data filtering algorithm without relying on MAC authentication for wireless sensor networks", Journal on Communications, vol. 30, No. 6, Jun. 2009, pp. 53-63.
(Continued)

*Primary Examiner* — Lindsay M Maguire
(74) *Attorney, Agent, or Firm* — Bryan Cave Leighton Paisner LLP

(57) ABSTRACT

The present disclosure relates to a virtual sensor system for measuring a VOC inflow amount of an RTO and a method for verifying a VOC measurement sensor using the same, specifically a two methods-based virtual sensor system that can be used in parallel with a VOC measurement sensor to check a calibration time point and can ultimately replace the VOC measurement sensor, and a method for verifying the reliability of the VOC measurement sensor using the same.

12 Claims, 5 Drawing Sheets

(58) Field of Classification Search

CPC ........... G01N 33/007; G01N 2030/884; G05B 19/0428; G05B 23/0297; F23N 5/242; F23N 5/123; F23G 2209/14; F23G 7/06

See application file for complete search history.

(56) References Cited

U.S. PATENT DOCUMENTS

| | | | | |
|---|---|---|---|---|
| 7,787,969 | B2 * | 8/2010 | Grichnik ............ | F02D 41/1405 703/2 |
| 2018/0171787 | A1 | 6/2018 | Chen et al. | |
| 2021/0280391 | A1 | 9/2021 | Spuller et al. | |

FOREIGN PATENT DOCUMENTS

| | | | |
|---|---|---|---|
| CN | 101681155 | A | 3/2010 |
| CN | 101802728 | A | 8/2010 |
| CN | 103677838 | A | 3/2014 |
| CN | 109308035 | A | 2/2019 |
| CN | 110763753 | A | 2/2020 |
| CN | 113655111 | A | 11/2021 |
| EP | 3525055 | A | 8/2019 |
| JP | H7-301413 | A | 11/1995 |
| JP | 2003-57221 | A | 2/2003 |
| JP | 2007-138921 | A | 6/2007 |
| JP | 2008-275383 | A | 11/2008 |
| JP | 2010-169340 | A | 8/2010 |
| JP | 2015-71129 | A | 4/2015 |
| JP | 6866838 | B2 | 4/2021 |
| KR | 10-2001-0036423 | A | 5/2001 |
| KR | 10-1372489 | B1 | 3/2014 |
| KR | 10-1607878 | B1 | 4/2016 |
| KR | 10-1894541 | B1 | 10/2018 |
| KR | 10-2021-0019909 | A | 2/2021 |
| KR | 2021-0097412 | A | 8/2021 |

OTHER PUBLICATIONS

Tam jun et al: “Virtual Debugging of Automobile Panel Parts Die”, China Academic Journal Electronic Publishing House., No. 8, 2017, pp. 35-38.

Liang Jie et al: “Design of Gas Sensor Calibration System”, Computer Measurement & Control, vol. 26, No. 4, 2018, pp. 281-284.

* cited by examiner (a)

(b)

(a)

(b)

VIRTUAL SENSOR SYSTEM FOR MEASURING VOC INFLOW AMOUNT OF RTO AND METHOD FOR VERIFYING VOC MEASUREMENT SENSOR BY USING SAME

CROSS-REFERENCE TO RELATED APPLICATION(S)

This application is a National Phase entry pursuant to 35 U.S.C. § 371 of International Application No. PCT/KR2022/012790, filed on Aug. 26, 2022, and claims priority to and the benefit of Korean Patent Application No. 10-2022-0018487, filed on Feb. 11, 2022 in the Korean Intellectual Property Office, the contents of which are incorporated herein by reference in their entirety.

TECHNICAL FIELD

The present invention relates to a virtual sensor system for measuring a volatile organic compounds ("VOC") inflow amount of a regenerative thermal oxidizer ("RTO") and a method for verifying a VOC measurement sensor using the same, more specifically, to a system and method for capable of verifying the reliability of the VOC measurement sensor using a two methods-based virtual sensor.

BACKGROUND

A regenerative thermal oxidizer (RTO) refers to a device that incinerates and removes volatile organic compounds (VOC) gas generated in a process. The RTO includes a combustion chamber and a predetermined number of beds made of a thermal storage material to increase a heat recovery rate. On the other hand, since the RTO uses the thermal storage material, there is a risk of a safety accident occurring upon a sudden temperature change. In particular, when a high concentration of VOC is introduced, a rapid temperature increase may occur within a few seconds. Continuous monitoring of an amount of VOC flowing into the RTO is necessary. In order to solve this problem, in general, a method of monitoring the VOC inflow amount using a sensor that measures the amount of VOC flowing into the RTO in real time is being used. However, a flame ionization detector ("FID") sensor, which is known to be the most reliable among VOC measuring sensors, may also cause a measurement error, which makes it difficult to accurately determine the VOC inflow amount.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE OF THE INVENTION

Technical Problem

The present invention is to solve the problems described above, and to provide a virtual sensor system that can be used in parallel with the VOC measurement sensor to check a calibration time point and a method for diagnosing a VOC measurement sensor using the same.

Technical Solution

In order to solve the problems described above, the present disclosure provides a virtual sensor system for measuring a VOC inflow amount of an RTO, the virtual sensor system including a plurality of RTOs and an RTO control device for controlling the RTOs, in which the RTO control device comprises a reliability verification unit that verifies the presence or absence or reliability of a FID sensor, a first virtual sensor unit equipped with a first VOC calculation model trained to estimate the VOC inflow amount by using RTO operation data, a second virtual sensor unit equipped with a second VOC calculation model for calculating the VOC inflow amount by using VOC combustion energy, and a control unit that controls operations of the first virtual sensor unit and the second virtual sensor unit according to a verification result of the reliability verification unit and the presence or absence of the FID sensor.

In this case, each RTO may include a flame ionization detector (FID) sensor unit that measures the VOC inflow amount at first regular intervals, and an operation data measurement unit that measures the RTO operation data at second regular intervals. The reliability verification unit determines that the FID sensor reliability is low when any one of a case in which a VOC inflow measurement value input from the FID sensor unit of each RTO does not change for a predetermined time or more or a case in which the VOC inflow measurement value exceeds a reference value even though there is no change beyond a reference range in the RTO operation data.

The control unit may include a virtual sensor selection unit that calculates the VOC inflow amount from the first virtual sensor unit when it is determined that the FID sensor exists and the FID sensor reliability is high, and calculates the VOC inflow amount from the second virtual sensor unit when it is determined that the FID sensor does not exist or the FID sensor reliability is low, as a result of the verification of the reliability verification unit. The control unit may further include a diagnostic alarm generation unit that mutually compares the VOC inflow amount from the first virtual sensor unit or the second virtual sensor unit acquired by the virtual sensor selection unit with the VOC inflow measurement value of the FID sensor at the same time point, and generates a diagnostic alarm for the VOC inflow measurement value according to the comparison result.

The first VOC calculation model of the first virtual sensor unit may be an artificial intelligence neural network model trained by using the VOC inflow measurement values measured by the FID sensor unit and the RTO operation data corresponding to the VOC inflow measurement values. The second VOC calculation model of the second virtual sensor unit may calculate the VOC inflow amount from combustion energy of the RTO, hot air temperature rise energy before/after combustion, and combustion energy of the VOC.

The VOC inflow amount $VOC_f$ from the second virtual sensor unit may be calculated by the following equations below:

$$VOC_f = VOC_{in}/\text{hot air inflow amount}$$

$$VOC_{in} = VOC\ \text{combustion energy}/VOC\ \text{combustion heat}$$

$$VOC\ \text{combustion energy} = (\text{hot air temperature rise energy before/after combustion}) - \text{fuel combustion energy}.$$

In addition, the present disclosure provides a method for verifying a VOC measurement sensor of an RTO using a virtual sensor, the method including a data measurement and collection step of collecting operation data and a VOC sensor measurement value measured at regular intervals from each of a plurality of RTOs, a VOC sensor verification and virtual sensor selection step of verifying VOC sensor reliability of the RTO based on the collected VOC sensor measurement values for each RTO and selecting one of a training based virtual sensor and a theory-based virtual sensor based on the verification result, a virtual sensor prediction value acquisition step of acquiring a calculated value of VOC inflow amount from the virtual sensor selected for each RTO in the VOC verification and virtual sensor selection step, a sensor data comparison step of mutually comparing the calculated value of VOC inflow amount acquired for each RTO through the virtual sensor prediction value acquisition step with the collected VOC sensor measurement value at the same time point, and a diagnostic alarm generation step of generating a diagnostic alarm for the VOC sensor measurement value when there is a difference between the calculated value of VOC inflow amount and the VOC sensor measurement value by a predetermined reference value or more as a result of the comparison.

In the VOC sensor verification and virtual sensor selection step, a training-based virtual sensor is selected when the VOC sensor exists and the VOC sensor reliability is greater than or equal to a predetermined reference and a theory-based virtual sensor is selected if the VOC sensor does not exist or the VOC sensor reliability is less than the predetermined reference. The training-based virtual sensor may calculate the VOC inflow amount using RTO operation data through an artificial intelligence neural network model trained by using the VOC sensor measurement values and the RTO operation data corresponding to the VOC sensor measurement values.

The theory-based virtual sensor may calculate a VOC inflow amount $VOC_f$ by the following equations below, using the combustion energy of RTO, hot air temperature rise energy before/after combustion, and combustion energy of VOC:

$$VOC_f = VOC_{in}/\text{hot air inflow amount}$$

$$VOC_{in} = VOC\text{ combustion energy}/VOC\text{ combustion heat}$$

$$VOC\text{ combustion energy} = (\text{hot air temperature rise energy before/after combustion}) - \text{fuel combustion energy.}$$

Advantageous Effects

According to an embodiment of the present disclosure, a virtual sensor that can be used in parallel with the VOC measurement sensor to check the calibration time point and ultimately can replace the VOC measurement sensor is provided. Therefore, it is possible to reduce the risk of safety accidents by minimizing the measurement error of the existing VOC measurement sensor to accurately grasp the VOC inflow amount of the RTO.

MODE FOR CARRYING OUT THE INVENTION

Figure 1:
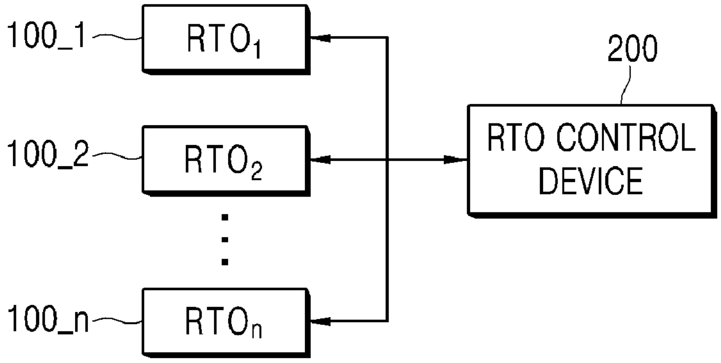
FIG. 1 is a diagram schematically illustrating the overall configuration of a virtual sensor system for measuring a VOC inflow amount of an RTO according to an embodiment of the present disclosure.

Hereinafter, embodiments of the present disclosure will be described in detail with reference to the accompanying drawings so that those of ordinary skill in the art can easily embody the present disclosure. However, the present disclosure may be implemented in various different forms and is not limited to the embodiments described herein. In order to clearly describe the present disclosure in the drawings, parts irrelevant to the description are omitted, and similar reference numerals are attached to similar parts throughout the specification.

Hereinafter, the present disclosure will be described in detail with reference to the drawings.

1. Terms Used in the Present Disclosure.

1.1. RTO Operation Data/Derived Factor

The RTO operation data refers to measurement values of various sensors disposed inside the RTO during RTO operation.

Specifically, the RTO operation data may include an RTO blower driving power amount, an LNG fuel input amount, a bed inlet temperature/pressure, a chamber temperature, a chamber outlet temperature, bed upper/lower temperature, etc. Accordingly, various sensors may be composed of sensors necessary for measuring operation data, such as a blower power amount sensor, a LNG fuel amount sensor, a bed inlet temperature/pressure sensor, a chamber temperature sensor, a chamber outlet temperature sensor, and a bed upper/lower temperature sensor.

Meanwhile, the derived factors are values acquired from the RTO operation data, and may include a chamber temperature change (dT), a bed upper/lower temperature difference (Tbed_diff), etc.

1.2. VOC Sensor

The VOC sensor refers to a physical sensor that is disposed in each of a plurality of RTOs and measures the amount of VOC flowing into the corresponding RTO in real time. In the present disclosure, the VOC sensor may be implemented as a commonly known flame ionization detector (FID).

In the present disclosure, the 'VOC sensor' may be used interchangeably with a'FID sensor unit'.

1.3. Virtual Sensor

The virtual sensor is used in parallel with the VOC sensor to check a calibration timing point, and is a sensor developed to ultimately replace the physical sensor. The virtual sensor is implemented based on the concept of inversely calculating a VOC inflow amount using the RTO operation data.

This virtual sensor is composed of a training-based virtual sensor that estimates the VOC inflow amount using machine learning techniques using the RTO operation data and derived factors obtained therefrom and a theory-based virtual sensor that is based on the First Principle and predicts VOC inflow amount/concentration based on a difference between fuel combustion energy and hot air temperature rise energy generated inside the RTO.

2. Virtual Sensor System for Measuring VOC Inflow Amount of RTO According to the Present Disclosure The virtual sensor system for measuring the VOC inflow amount of the RTO according to the present disclosure is a system for monitoring the VOC inflow amount of each regenerative thermal oxidizer (RTO) in the plurality of regenerative thermal oxidizers (RTO1, RTO2, . . . , RTOn).

FIG. 1 is a diagram schematically illustrating the overall configuration of the virtual sensor system for measuring the VOC inflow amount of the RTO according to an embodiment of the present disclosure.

Referring to FIG. 1, the system of the present disclosure is largely configured with a plurality of RTOn 100_1, 100_2, . . . , 100_*n* and a RTO control device 200 for controlling the RTOns.

2.1. Regenerative Thermal Oxidizer (RTO)

Figure 2:
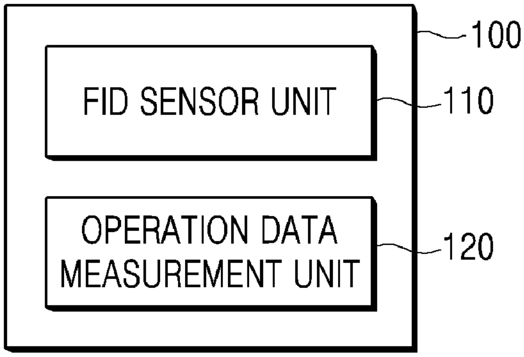
FIG. 2 is a diagram schematically illustrating an internal configuration of the RTO and an RTO control device according to an embodiment of the present disclosure.
Figure 2:
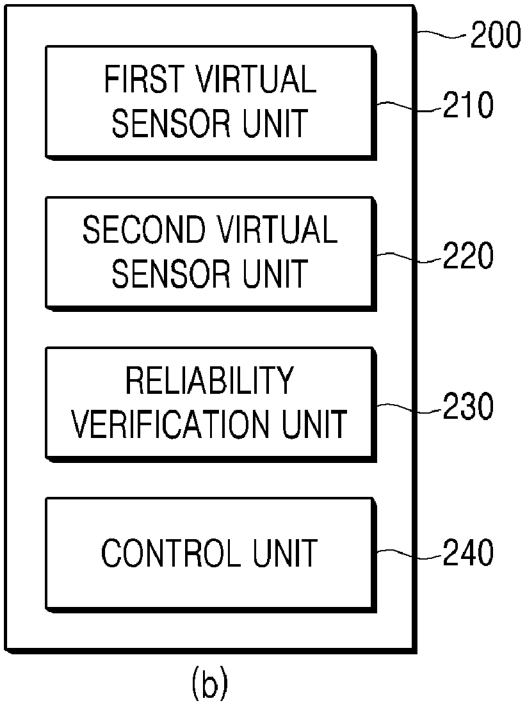

FIG. 2(*a*) is a diagram schematically illustrating the internal configuration of the RTO according to an embodiment of the present disclosure.

Referring to FIG. 2(*a*), respective RTOn 100_1, 100_2, . . . , 100_*n* included in the system of the present disclosure may include the following configuration.

2.1.1. FID Sensor Unit 110

Figure 3:
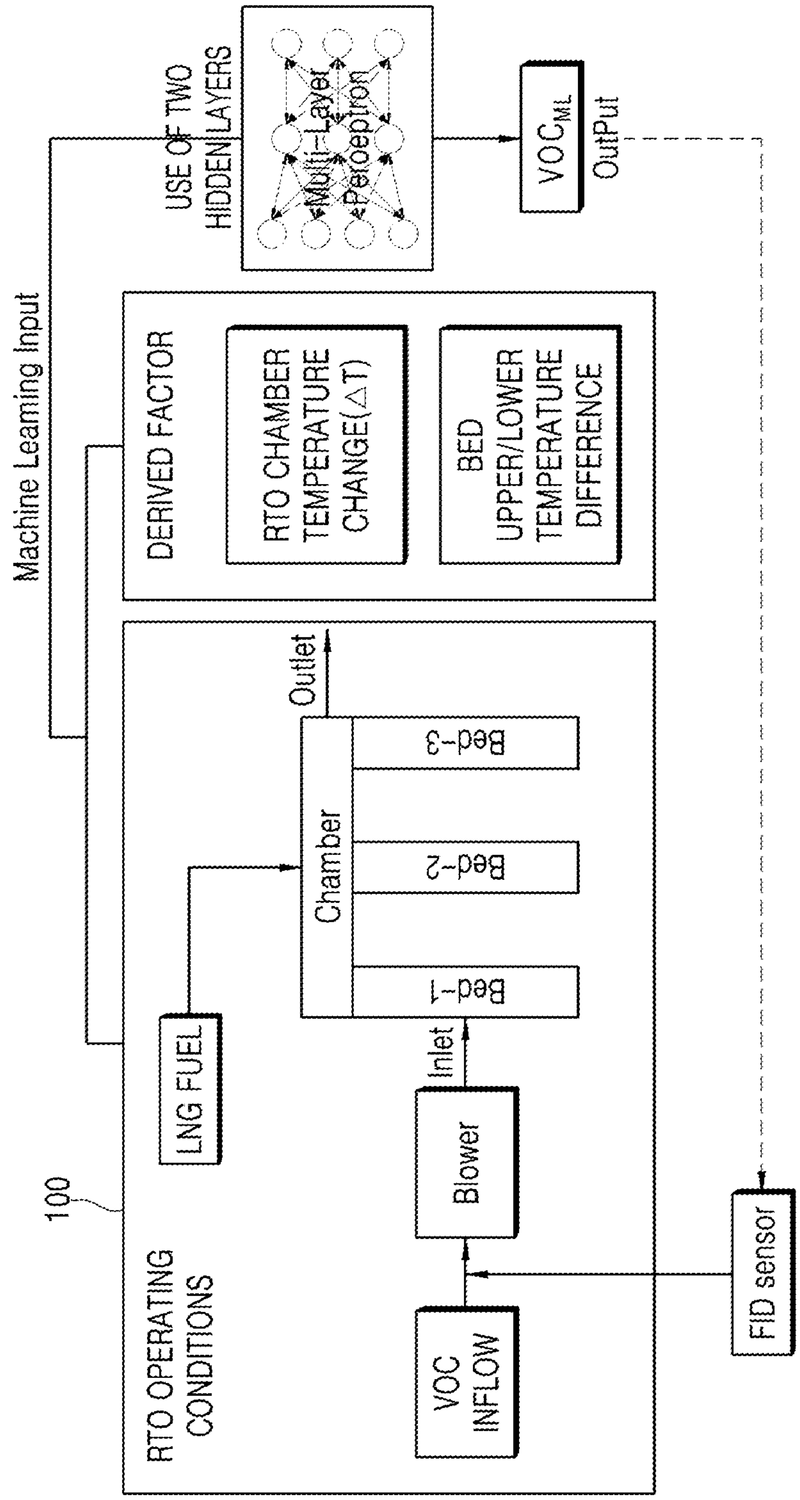
FIG. 3 is a diagram illustrating a first VOC calculation model training process according to an embodiment of the present disclosure.

The FID sensor unit 110 is composed of the flame ionization detector (FID) and is a VOC sensor that periodically measures the VOC inflow amount in real time. For example, as illustrated in FIG. 3, it may be disposed near a blower to detect/measure the amount of VOC introduced. A value measured by the FID sensor unit 110 may be referred to as an FID sensor measurement value, a VOC sensor measurement value, or VOC1 hereinafter.

2.1.2. Operation Data Measurement Unit 120

The operation data measurement unit 120 is configured with various sensors necessary for measuring RTO operation data including the RTO blower driving power amount, the LNG fuel input amount, the bed inlet temperature/pressure, the chamber temperature, the chamber outlet temperature, the bed upper/lower temperature, etc., and is configured to measure the operation data in real time at regular intervals.

2.2. RTO Control Device 200

FIG. 2(*b*) is a diagram schematically illustrating the internal configuration of the RTO control device according to an embodiment of the present disclosure.

Referring to FIG. 2(*b*), the RTO control device 200 of the present disclosure may include the following configuration.

2.2.1. First Virtual Sensor Unit 210

The first virtual sensor unit 210 is a training-based virtual sensor for estimating the VOC inflow amount by machine learning by utilizing the RTO operation data.

More specifically, the first virtual sensor unit 210 generates a first VOC calculation model using the RTO operation data and FID sensor measurement values acquired from each RTO, and estimates/predicts the VOC inflow amount from operation data of each RTO through the generated first VOC calculation model as an output value of the training-based sensor.

The first virtual sensor unit 210 may be configured to include the following detailed configuration.

a. First Operation Data Input Unit

The first operation data input unit is configured to receive operation data measured in real time from the operation data measurement unit 120 of each of the plurality of RTOns 100_1, 100_2, . . . , 100_*n*.

b. VOC Inflow Amount Estimation ML Training Unit

The VOC inflow estimation ML training unit generates the first VOC calculation model, which is a VOC inflow amount estimation model, by performing machine learning in which operation data of each RTO received from the first operation data input unit and the derived factor generated from the operation data are used as an input and using the FID sensor measurement value of the FID sensor unit 110 is used as an output.

FIG. 3 is a diagram illustrating a first VOC calculation model training process according to an embodiment of the present disclosure.

Referring to FIG. 3, a process of training the first VOC calculation model is performed in a way of inputting the input variable composed of RTO operation data and the derived factor generated therefrom to two hidden layers and conducting supervised learning with the FID sensor measurement value VOC1 as a true value.

That is, the first VOC calculation model is an artificial intelligence neural network model trained by using the VOC inflow measurement values of the FID sensor 110 and the RTO operation data corresponding to the VOC inflow measurement values.

Here, the derived factor may include the chamber temperature change dT acquired from the chamber temperature of the RTO operation data, and the bed upper and lower temperature difference acquired from the bed upper/lower temperatures, as described above.

Such a first virtual sensor unit 210 estimates/predicts the VOC inflow amount of the corresponding RTO from the RTO operation data acquired from the plurality of RTOns 100_1, 100_2, . . . , 100_*n* using the trained first VOC calculation model, and the output value thereof may be referred to as a training-based virtual sensor prediction value VOC2.

Figure 4:
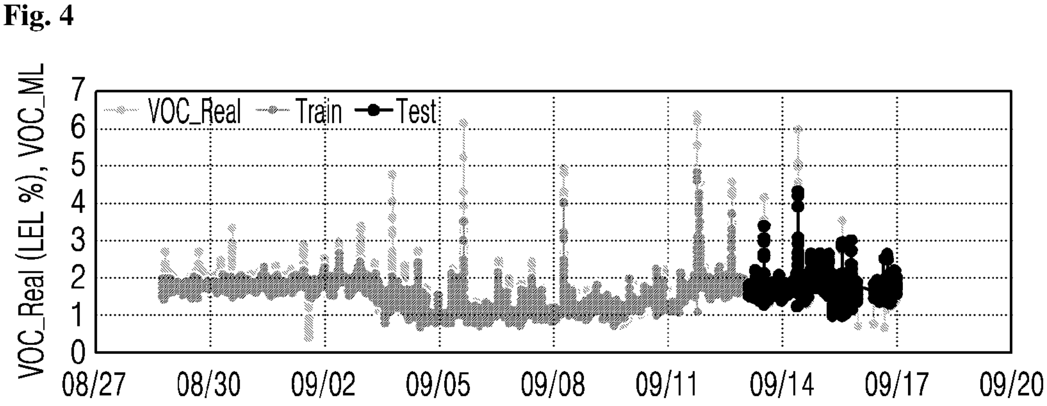
FIG. 4 is a diagram illustrating an example of a result of applying the first VOC calculation model according to an embodiment of the present disclosure.
Figure 4:
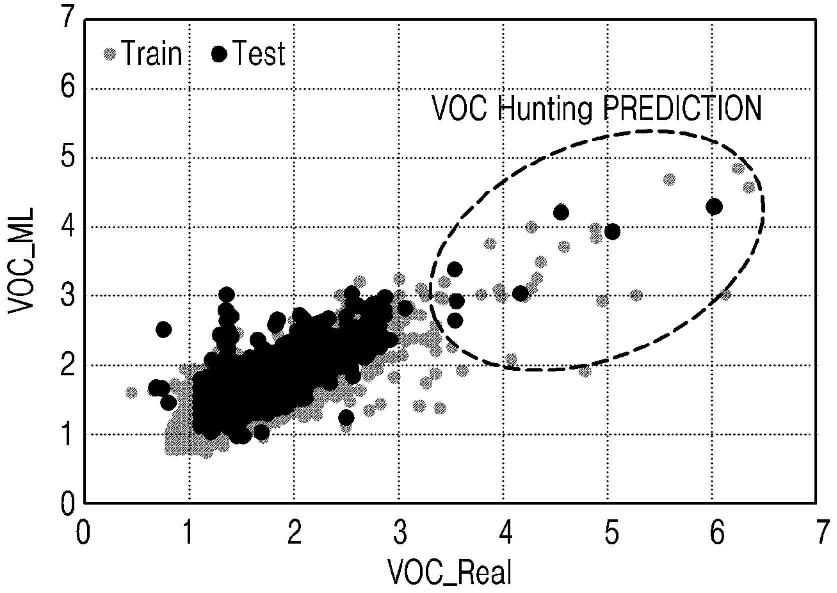

FIG. 4 is a diagram illustrating an example of a result of applying the trained VOC inflow amount estimation model (first VOC calculation model) according to an embodiment of the present disclosure.

When looking at the graph shown in FIG. 4(*a*), the light gray graph is the VOC sensor measurement value over a period of time, the dark grey graph is the VOC inflow amount predicted value in the supervised learning process using the VOC sensor measurement values and RTO operation data corresponding to the VOC sensor measurement values, and the black graph shows the VOC inflow amount estimated/calculated from actual RTO operation data by using the trained model. When the actual measured value (gray graph) of the VOC sensor, which is a physical sensor, and the predicted value (black graph) from the trained model are mutually compared with each other, it is possible to check a time point at which a difference of a predetermined reference value or more occurs, and through this, the VOC sensor measurement error can be minimized by diagnosing/verifying the VOC sensor measurement value at the corresponding time point. In addition, as illustrated in FIG. 4(*b*), it is possible to check the calibration time point through the comparison between the actual measured value of the VOC sensor and the VOC inflow predicted value estimated by applying the trained model, and thus the diagnosis/verification of the VOC sensor measurement value can be performed to reduce the measurement error.

2.2.2. Second Virtual Sensor Unit 220

The second virtual sensor unit 220 is a theory-based virtual sensor equipped with a second VOC calculation model for calculating the VOC inflow amount of RTO by using VOC combustion energy. More specifically, it is configured to predict the VOC inflow amount and/or concentration based on the difference between the combustion energy of fuel and the hot air temperature rise energy generated inside the RTO.

The second virtual sensor unit 220 may be configured to include the following detailed configuration.

a. Second Operation Data Input Unit

The second operation data input unit is configured to receive RTO operation data measured in real time from the operation data measurement unit 120 of each of the plurality of RTOns 100_1, 100_2, . . . , 100_*n*.

b. Combustion Energy Calculation Unit

The combustion energy calculation unit calculates combustion energy $Q_1$ of the fuel LNG by the following equation.

$$Q1 = LNG\ \text{input} \times 43{,}950 \qquad \text{Equation 1}$$

Here, 43,950 refers to the specific heat capacity, which is the heat energy required to raise the temperature of a unit mass of matter by 1 degree. The energy generated by combustion per 1 $Nm^3$ of LNG fuel is 43.95 MJ. This was converted into a unit kJ and calculated and a value of 43,950 is used use as the specific heat capacity. Each unit is LNG input amount [$Nm^3$/hr] and 43,950 [kJ/$Nm^3$], and thus the unit of combustion energy of LNG fuel is [kJ/hr].

On the other hand, the LNG input amount (flow rate) can be measured by using a conventional LNG inflow amount measuring instrument (sensor). Although not illustrated in the drawings, the LNG inflow amount measurement sensor may be disposed in a pipe directly connected to the RTO to measure the flow rate of LNG. For complete combustion, since it is necessary to adjust the amount of air input along with the amount of LNG input, the flow sensor is typically preferably located near the RTO.

c. Hot Air Temperature Rise Energy Before/after Combustion Calculation Unit

The hot air temperature rise energy before/after combustion calculation unit calculates energy Q2 required for the temperature rise of the air flowing into the RTO by Equation 2 below.

$$Q2 = m \times Cp \times (T1 - T2) \qquad \text{Equation 2}$$

Here, m means the air flow rate. This is calculated from differential pressure data of the air flow sensor or a pressure sensor at an input end and a pressure sensor at an output end of the blower.

Further Cp is computed from $$\frac{101{,}325}{286.9 \times (\text{air temperature} + 273.15)} 101{,}325 \cdot 286.9 \times (\text{공기 온도} + \text{đ}\cdot$$

This is the part that calculates the density of air using the ideal gas equation (pressure=density×gas constant×temperature). 101,325 (Pa) is the pressure, 286.9 (kJ/kg) is the gas constant, and 273.15 is the absolute zero value. However, the above Equation 2 corresponds to the case where the unit of the air flow rate m is [kg/hr]. When the unit of the air flow rate m is [$m^3$/hr], the above Equation 2 may be further multiplied by an air density value (e.g., 120).

Further, T1 is the temperature of the bed inlet temperature, and T2 is the the temperature after combustion, which is the chamber outlet temperature. Since a structure in which the air introduced into the blower flows into the bed inlet and exits to the chamber outlet in the RTO chamber is adopted, temperature sensors are disposed at respective locations of the bed inlet and chamber outlet to measure the temperatures before/after combustion, respectively. More specifically, when the heat storage material is configured in two stages, the temperature sensor located inside the RTO is usually located before/after passing the first heat storage material, after passing the second heat storage material, in a combustion chamber, etc. Thus, according to an embodiment of the present disclosure, the combustion chamber temperature, the temperature after combustion, the temperature after passing the second heat storage material, the temperature before combustion, that is, the temperature value immediately after passing through all the heat storage materials may be used.

d. VOC Inflow Amount Calculation Unit

The VOC inflow amount calculation unit calculates the VOC inflow amount by Equation 3 below by using the combustion energy Q1 calculated by the combustion energy calculation unit and the energy Q2 required for the temperature rise of the air flowing into the RTO calculated in the hot air temperature rise energy before/after combustion calculation unit.

$$VOC\ \text{inflow amount} = \frac{Q3}{VOC\ \text{heat of combustion}} \qquad \text{Equation 3}$$

Here, Q3=Q2−Q1, which refers to the value acquired by subtracting the combustion energy from hot air temperature rise before/after combustion.

On the other hand, the VOC heat of combustion is different for each VOC material, and can be obtained in a known manner using standard enthalpy of formation.

e. LEL Concentration Calculation Unit

The second virtual sensor unit may further include an LEL concentration calculation unit for calculating the LEL concentration (%) of the VOC by Equation 4 below.

$$LEL(\%) = \frac{(Q2 - Q1) \times 0.016}{\text{air flow rate} \times 1.93 \times \frac{101{,}325}{286.9 \times (\text{air temperature} + 273.15)}} = \frac{(VOC\ \text{inflow amount})}{(\text{hot air inflow amount})} \qquad \text{Equation 4}$$

Here, (Q2−Q1) is the difference between the hot air temperature rise energy before/after combustion Q2 calculated by Equation 2 and the combustion energy Q1 calculated by Equation 1 above, that is, energy generated by the combustion of VOC.

Further, 1.93 is a value indicating the density of the VOC substance Butene. Since the density of Butene is about 1.93 times that of air, the density of VOC (Butene) is obtained by multiplying the part $$\frac{101{,}325}{286.9\times(\text{air temperature}+273.15)},$$

which is a part to obtain the density of air, by 1.93.

Further, in the case of Butene, LEL 100% is 1.6%. LEL 1% means that the ratio of air and Butene is 0.016%, that is, it means that 0.00016 $m^3$/hr of Butene is contained when the air flow rate is 100 $m^3$/hr.

Here, 1.93 and 0.016 correspond to the case where the VOC material is Butene, and they vary depending on the VOC material.

In the case of the LEL concentration (%) of VOC, since it can be calculated through the ratio of the VOC inflow amount and the air flow rate calculated through Equations 1 to 3 above, it can be set to obtain the VOC inflow amount or LEL concentration (%) as an output value of the theory-based virtual sensor, which is the final output value of the second virtual sensor unit 220, if necessary.

2.2.3. Reliability Verification Unit 230

The reliability verification unit 230 has a configuration in which the VOC sensor measurement value is received from each of the plurality of RTOns 100_1, 100_2, . . . , 100_*n*, and based on this, the VOC sensor reliability of the RTO or the presence or absence of the VOC sensor (FID sensor unit 110) is verified.

As a reference for verifying the VOC sensor reliability, if the VOC sensor measurement value satisfies any one of the following two cases, it may be determined that the corresponding VOC sensor reliability is low.

Figure 5:
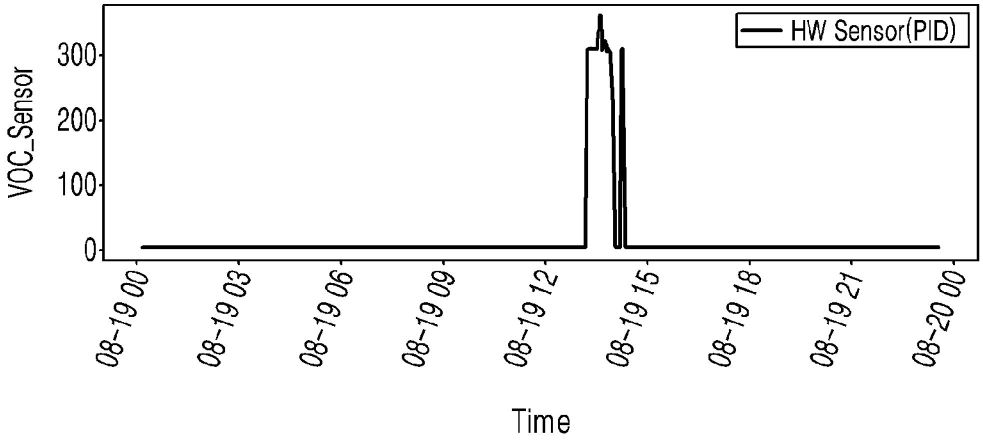
FIGS. 5 and 6 are diagrams illustrating examples of VOC sensor reliability verification criteria according to an embodiment of the present disclosure.
Figure 6:
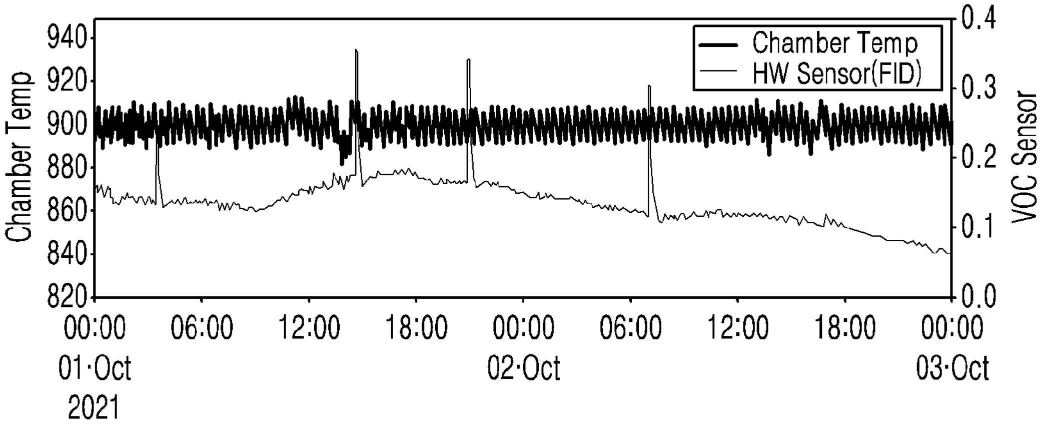

FIGS. 5 and 6 are diagrams illustrating an example of determining that the VOC sensor reliability is low according to an embodiment of the present disclosure.

As a first case, as illustrated in FIG. 5, when the VOC sensor measurement value does not change for a predetermined time or more, it may be determined that the reliability of the VOC sensor is low.

As a second case, as illustrated in FIG. 6, if a case where the VOC sensor measurement value exceeds the reference value occurs by a predetermined number of times or more even though there is no change beyond the reference range in the RTO operation data, it may be determined that the reliability of the corresponding VOC sensor is low. Here, in the case of FIG. 6, the change in the chamber temperature value among the RTO operation data is displayed in thick line, and the VOC sensor measurement value is displayed in a thin line.

When any one of the first and second cases is satisfied, it is determined that the VOC sensor reliability of the corresponding RTO is low, and, for example, a low signal indicating the same may be output. On the other hand, when both the first and second cases are not applicable, it is determined that the VOC sensor reliability of the corresponding RTO is high, and, for example, a high signal indicating the same may be output.

2.2.4. Control Unit 240

The control unit 240 is configured to acquire the calculated value of VOC inflow amount from any one of the first virtual sensor unit 210 and the second virtual sensor unit 220 according to the verification result of the reliability verification unit 230 and the presence or absence of the FID sensor for each of RTOs 100_1, 100_2, . . . , 100_*n*, and generate a diagnostic alarm for the VOC sensor measurement value of the corresponding RTO through mutual comparison between the acquired VOC inflow amount from the virtual sensor with the VOC sensor measurement value of the FID sensor unit 110.

a. Virtual Sensor Selection Unit

The virtual sensor selection unit may select any one of the first virtual sensor unit 210 and the second virtual sensor unit 220 according to the verification result of the reliability verification unit 230 and the presence or absence of the FID sensor for each of RTOs 100_1, 100_2, . . . , 100_*n*, and calculate and acquire the VOC inflow amount therefrom.

Specifically, when an FID sensor exists and it is determined that the reliability of the VOC sensor is high (when a high signal is output) as a result of the verification of the reliability verification unit 230, the virtual sensor prediction value of the corresponding RTO may be calculated/acquired from the VOC inflow amount from the first virtual sensor unit 210.

On the other hand, when the FID sensor does not exist or it is determined that the reliability of the VOC sensor is low (when a low signal is output) as a result of the verification of the reliability verification unit 230, the virtual sensor prediction value of the corresponding RTO may be calculated/acquired from the VOC inflow amount from the second virtual sensor unit 220.

b. Diagnostic Alarm Generation Unit

The diagnostic alarm generation unit mutually compares the VOC inflow amount from the first virtual sensor unit or the second virtual sensor unit acquired by the virtual sensor selection unit with the VOC inflow measurement value of the FID sensor of the corresponding RTO at the same time point, and generates a diagnostic alarm for the VOC sensor measurement value according to the comparison result.

As a result of the comparison, when there is a difference between the VOC inflow amount from the first virtual sensor unit 210 or the second virtual sensor unit 220 and the VOC sensor measurement value by a predetermined reference value or more, a diagnostic alarm may be generated to prompt the user to verify the corresponding VOC sensor measurement value.

3. Method for Verifying VOC Measurement Sensor of RTO Using Virtual Sensor According to the Present Disclosure The system for verifying the VOC measurement sensor of the RTO using the virtual sensor according to an embodiment of the present invention, as described above, is configured to include the plurality of RTOns 100_1, 100_2, . . . , 100_*n* and the RTO control device 200 for controlling the RTOns. The method for verifying the VOC measurement sensor of such a system may include the following steps 3.1. Data Measurement and Collection Step The data measurement and collection step is a step of collecting operation data and VOC sensor measurement values measured in real time at regular intervals from each of the plurality of RTOns 100_1, 100_2, . . . , 100_*n*.

More specifically, real-time VOC sensor measurement values and RTO operation data are collected from the FID sensor unit 110 and the operation data measurement unit 120, which is composed of various sensors, provided for each of the RTOs 100_1, 100_2, . . . , 100_*n*.

3.2. VOC Sensor Verification and Virtual Sensor Selection Step

The VOC sensor verification and virtual sensor selection step is a step of verifying the reliability of the VOC sensor of the corresponding RTO based on the collected VOC sensor measurement values for each of the RTOs 100_1, 100_2, . . . , 100_*n* and selecting one of the training-based virtual sensor and the theory-based virtual sensor based on the verification result.

Specifically, when any one of a case where the VOC sensor measurement value does not change for a predetermined time or more and a case where the VOC sensor measurement value exceeds the reference value occurs by a predetermined number of times or more even though there is no change beyond the reference range in the RTO operation data is satisfied, it may be determined that the reliability of the VOC sensor of the corresponding RTO is low. Since such a VOC sensor reliability verification reference has been described in detail with reference to FIGS. 5 and 6 in the system configuration above, a detailed description thereof will be omitted.

Meanwhile, when it is determined that the reliability of the VOC sensor measurement value is high as a result of the verification, the training-based virtual sensor equipped with the first VOC calculation model trained to estimate the VOC inflow amount using the RTO operation data is selected. On the other hand, when it is determined that the reliability of the VOC sensor measurement value is low, the theory-based virtual sensor equipped with the second VOC calculation model that calculates the VOC inflow amount using VOC combustion energy is selected. Here, it is set to select the theory-based virtual sensor even when the VOC sensor does not exist.

For example, when it is determined that the sensor reliability of the second RTO 100_2 is high, the training-based virtual sensor is selected, and when it is determined that the sensor reliability is low, the theory-based virtual sensor is selected.

The virtual sensor selected in this way can be used to determine whether or not diagnosis of the VOC sensor value of the RTO is necessary by using the predicted value obtained from the corresponding virtual sensor in a step to be described later.

3.3. Virtual Sensor Prediction Value Acquisition Step

The virtual sensor prediction value acquisition step is a step of acquiring the predicted value from the selected virtual sensor for each RTO in the VOC verification and virtual sensor selection step.

When the selected virtual sensor is the training-based virtual sensor, the VOC inflow amount estimated using the operation data of the RTO through the first VOC calculation model from training-based virtual sensor can be acquired as a virtual sensor prediction value VOC2.

Here, the first VOC calculation model is an artificial intelligence neural network model generated by inputting input variables composed of RTO operation data and derived factors generated therefrom into two hidden layers, and conducting supervised learning by using the VOC sensor measurement value VOC1 as a true value.

On the other hand, when the selected virtual sensor is the theory-based virtual sensor, the VOC inflow amount calculated from the VOC combustion energy of the RTO through the second VOC calculation model using Equations 1 to 4 above can be acquired as a virtual sensor prediction value VOC3.

Through these steps, the VOC inflow amount can be acquired from the selected virtual sensor according to the VOC sensor reliability level for each RTO.

3.4. Sensor Data Comparison Step

The sensor data comparison step is a step of mutually comparing the VOC inflow amount, which is the virtual sensor prediction value acquired for each RTO through the virtual sensor prediction value acquisition step, with the collected VOC sensor measurement values at the same time point.

For example, a VOC sensor measurement value VOC1_2 and a training-based virtual sensor prediction value VOC2_2 or a theory-based virtual sensor prediction value VOC3_2 at time t of the second RTO 100_2 are mutually compared with each other.

3.5. Diagnostic Alarm Generation Step

The diagnostic alarm generation step is a step of generating a diagnostic alarm for the VOC sensor value of the corresponding RTO when there is a difference between the virtual sensor prediction value and the VOC sensor measurement value by a predetermined reference value or more, as a result of the comparison.

When there is a difference between the VOC sensor measurement value and virtual sensor prediction value of the RTO by a predetermined reference value or more, a diagnostic alarm is generated to prompt the user to verify the VOC sensor measurement value.

Meanwhile, although the technical idea of the present disclosure has been described in detail according to the above embodiment, it should be noted that the above embodiment is for the purpose of description and not for limitation. Further, those skilled in the art will understand that various embodiments are possible within the scope of the technical idea of the present disclosure.

Below shows the names of the symbols used in the specification and drawings of the present disclosure.

199_1~100_n: RTO
110: FID sensor unit
120: Operation data measurement unit
200: RTO control device
210: First virtual sensor unit
220: Second virtual sensor unit
230: Reliability verification unit
240: Control unit

What is claimed is:

1. A virtual sensor system for measuring a volatile organic compounds (VOC) inflow amount of a regenerative thermal oxidizer (RTO), comprising:

a plurality of RTOs; and an RTO control device for controlling the RTOs, wherein the RTO control device comprises:

- a reliability verification unit that verifies the presence or absence, or reliability of a flame ionization detector (FID) sensor,
- a first virtual sensor unit equipped with a first VOC calculation model trained to estimate the VOC inflow amount by using RTO operation data,
- a second virtual sensor unit equipped with a second VOC calculation model for calculating the VOC inflow amount by using VOC combustion energy, and
- a control unit that controls operations of the first virtual sensor unit and the second virtual sensor unit according to a verification result of the reliability verification unit and the presence or absence of the FID sensor.

2. The virtual sensor system of claim 1, wherein each RTO comprises:

a flame ionization detector-(FID) sensor unit that measures the VOC inflow amount at first regular intervals, and an operation data measurement unit that measures the RTO operation data at second regular intervals.

3. The virtual sensor system of claim 2, wherein the reliability verification unit determines that the FID sensor reliability is low when any one of a case in which a VOC inflow measurement value input from the FID sensor unit of each RTO does not change for a predetermined time or more, or a case in which the VOC inflow measurement value exceeds a reference value even though there is no change beyond athe reference range in the RTO operation data.

4. The virtual sensor system of claim 3, wherein the control unit comprises:

a virtual sensor selection unit that calculates the VOC inflow amount from the first virtual sensor unit when it is determined that the FID sensor exists and the FID sensor reliability is high, and calculates the VOC inflow amount from the second virtual sensor unit when it is determined that the FID sensor does not exist or the FID sensor reliability is low, as a result of the verification of the reliability verification unit.

5. The virtual sensor system of claim 4, wherein the control unit further comprises:

a diagnostic alarm generation unit that mutually compares the VOC inflow amount from the first virtual sensor unit or the second virtual sensor unit acquired by the virtual sensor selection unit with the VOC inflow measurement value of the FID sensor at the same time point, and generates a diagnostic alarm for the VOC inflow measurement value according to the comparison result.

6. The virtual sensor system of claim 4, wherein the first VOC calculation model of the first virtual sensor unit is an artificial intelligence neural network model trained by using the VOC inflow measurement values measured by the FID sensor unit and the RTO operation data corresponding to the VOC inflow measurement values.

7. The virtual sensor system of claim 4, wherein the second VOC calculation model of the second virtual sensor unit calculates the VOC inflow amount from combustion energy of the RTO, hot air temperature rise energy before/after combustion, and combustion energy of the VOC.

8. The virtual sensor system of claim 7, wherein the VOC inflow amount $VOC_f$ from the second virtual sensor unit is calculated by Equation 1 below:

$$VOC_f = VOC_{in}/\text{hot air inflow amount} \quad \text{(Equation 1)}$$

$$VOC_{in} = VOC \text{ combustion energy}/VOC \text{ combustion heat}$$

$$VOC \text{ combustion energy} = (\text{hot air temperature rise energy before/after combustion}) - \text{fuel combustion energy.}$$

9. A method for verifying a volatile organic compounds (VOC) measurement sensor of a regenerative thermal oxidizer (RTO) using a virtual sensor, the method comprising:

a data measurement and collection step of collecting operation data and a VOC sensor measurement value measured at regular intervals from each of a plurality of RTOs;

a VOC sensor verification and virtual sensor selection step of verifying VOC sensor reliability of the RTO based on the collected VOC sensor measurement values for each RTO, and selecting one of a training-based sensor virtual sensor—and a theory-based virtual sensor based on the verification result;

a virtual sensor prediction value acquisition step of acquiring a calculated value of VOC inflow amount from the virtual sensor selected for each RTO in the VOC verification and virtual sensor selection step;

a sensor data comparison step of mutually comparing the calculated value of VOC inflow amount acquired for each RTO through the virtual sensor prediction value acquisition step and the collected VOC sensor measurement value at the same time point; and a diagnostic alarm generation step of generating a diagnostic alarm for the VOC sensor measurement value when there is a difference between the calculated value of VOC inflow amount and the VOC sensor measurement value by a predetermined reference value or more as a result of the comparison.

10. The method of claim 9, wherein, in the VOC sensor verification and virtual sensor selection step, a training-based virtual sensor is selected when the VOC sensor exists and the VOC sensor reliability is greater than or equal to a predetermined reference and a theory-based virtual sensor is selected if the VOC sensor does not exist or the VOC sensor reliability is less than the predetermined reference.

11. The method of claim 10, wherein the training-based virtual sensor calculates the VOC inflow amount using RTO operation data through an artificial intelligence neural network model trained by using the VOC sensor measurement values and the RTO operation data corresponding to the VOC sensor measurement values.

12. The method of claim 10, wherein the theory-based virtual sensor, by using the combustion energy of RTO, hot air temperature rise energy before/after combustion, and combustion energy of VOC, calculates a VOC inflow amount $VOC_f$ by Equation 1 below:

$$VOC_f = VOC_{in}/\text{hot air inflow amount} \quad \text{(Equation 1)}$$

$$VOC_{in} = VOC \text{ combustion energy}/VOC \text{ combustion heat}$$

$$VOC \text{ combustion energy} = (\text{hot air temperature rise energy before/after combustion}) - \text{fuel combustion energy.}$$

* * * * *